US010901654B2

United States Patent
Bondalakunta et al.

(10) Patent No.: US 10,901,654 B2
(45) Date of Patent: Jan. 26, 2021

(54) BUFFER CREDIT MANAGEMENT IN A DATA STORAGE SYSTEM

(71) Applicant: INTERNATIONAL BUSINESS MACHINES CORPORATION, Armonk, NY (US)

(72) Inventors: Asha Kiran Bondalakunta, Bangalore (IN); Muthulakshmi P. Srinivasan, Bangalore (IN); Raghavan Devanathan, Bangalore (IN); Sameer K. Sinha, Bangalore (IN); Ayush Nair, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/175,391

(22) Filed: Oct. 30, 2018

(65) Prior Publication Data
US 2020/0133564 A1 Apr. 30, 2020

(51) Int. Cl.
*G06F 3/06* (2006.01)
*G06F 13/40* (2006.01)

(52) U.S. Cl.
CPC .......... *G06F 3/0656* (2013.01); *G06F 3/0613* (2013.01); *G06F 3/0673* (2013.01); *G06F 13/4027* (2013.01)

(58) Field of Classification Search
CPC .. G06F 3/0611; G06F 13/122; G06F 13/4022; G06F 12/00
See application file for complete search history.

(56) References Cited

U.S. PATENT DOCUMENTS

| | | | |
|---|---|---|---|
| 6,457,077 B1 * | 9/2002 | Kelley | G06F 13/4059 710/100 |
| 8,918,542 B2 | 12/2014 | Carlson et al. | |
| 9,330,042 B2 | 5/2016 | Gainey, Jr. et al. | |
| 9,489,141 B2 | 11/2016 | Nanduri et al. | |
| 9,690,703 B1 * | 6/2017 | Jess | G06F 12/08 |
| 9,697,152 B1 * | 7/2017 | Riedy | G06F 13/122 |
| 9,892,065 B2 | 2/2018 | Hathorn et al. | |
| 2009/0210561 A1 * | 8/2009 | Ricci | G06F 13/122 710/5 |
| 2009/0210583 A1 * | 8/2009 | Bendyk | G06F 13/122 710/36 |

(Continued)

*Primary Examiner* — Getente A Yimer
(74) *Attorney, Agent, or Firm* — William K. Konrad; Konrad Raynes Davda & Victor LLP

(57) ABSTRACT

In one aspect of buffer credit management in accordance with the present description, buffer over-commit logic determines a buffer over-commit value as, in one embodiment, proportional to a determined difference value between the average duration of an I/O operation over data transmission channels connected to a target control unit, and an average of cumulative lifespans that a set of buffers of the target control unit is committed to an I/O operation. In another aspect, buffer over-commit logic determines a buffer over-commit value as, in one embodiment, inversely proportional to buffer lifespan. In another aspect, buffer over-commit logic determines a buffer over-commit value as, in one embodiment, proportional to the determined difference value and inversely proportional to buffer lifespan. Other features and aspects may be realized, depending upon the particular application.

21 Claims, 5 Drawing Sheets

(56) References Cited

U.S. PATENT DOCUMENTS

| | | | |
|---|---|---|---|
| 2010/0030918 A1* | 2/2010 | Casper | G06F 3/0611 |
| | | | 710/5 |
| 2014/0359168 A1 | 12/2014 | Carlson et al. | |
| 2015/0339184 A1* | 11/2015 | Kasahara | G06F 11/08 |
| | | | 714/758 |
| 2016/0342391 A1 | 11/2016 | Hathorn et al. | |
| 2016/0342548 A1 | 11/2016 | Hathorn et al. | |
| 2016/0342549 A1* | 11/2016 | Hathorn | G06F 13/4027 |
| 2017/0083463 A1 | 3/2017 | Kachare et al. | |
| 2018/0059935 A1* | 3/2018 | Chun | G06F 3/061 |

* cited by examiner

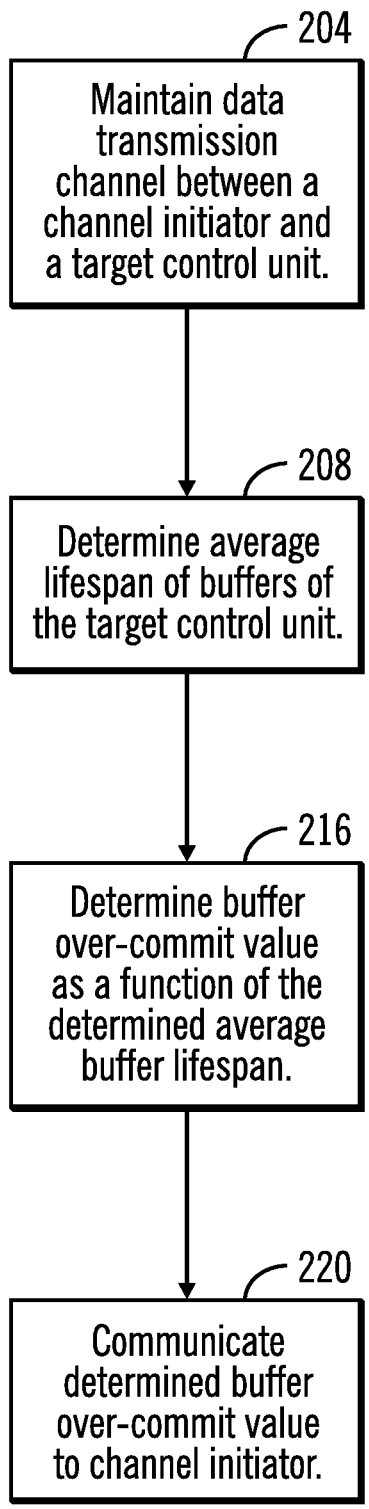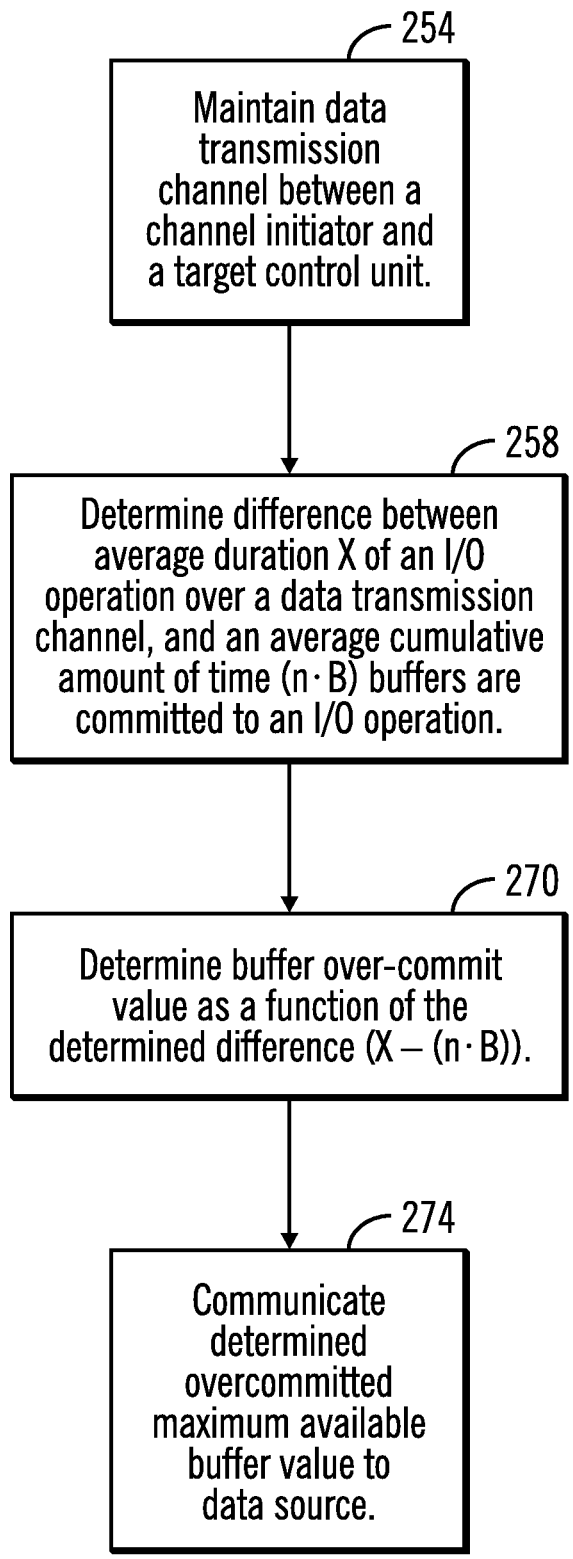
FIG. 4
FIG. 5 ly decide whether to carry out the next I/O operation in a first
BUFFER CREDIT MANAGEMENT IN A DATA STORAGE SYSTEM

BACKGROUND OF THE INVENTION

1. Field

The present invention relates to a computer program product, system, and method for buffer credit management in data storage systems.

2. Description of the Related Art

Input/output (I/O) operations may be used to transfer data between memory and I/O devices of an I/O processing system. For example, data may be written from memory to one or more I/O devices, and data may be read from one or more I/O devices to memory by executing I/O operations. To facilitate processing of I/O operations, an I/O subsystem of the I/O processing system may be employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a target control unit, the control unit being further coupled to and controlling one or more data storage devices.

In certain mechanisms, the channel subsystem and I/O device may operate in a transport mode that supports the transfer of one or more command control blocks to transfer data between the I/O devices and memory. A transport control word (TCW) may specify one or more I/O commands to be executed. For commands initiating certain I/O operations, the TCW designates memory areas associated with the operation, the action to be taken whenever a transfer to or from the area is completed, and other options.

In certain situations, the target control unit may be included in a storage device. In other situations, the target control unit may be included in a storage controller in which a storage management application that executes in the storage controller may manage a plurality of storage devices, such as disk drives, tape drives, flash drives, etc., that are coupled to the storage controller. The channels provided to communicate with the control unit may be used by a plurality of hosts that may access data stored in the storage devices.

Fibre Channel refers to an integrated set of architectural standards for data transfer being developed by the American National Standards Institute. Fibre Connection (FICON) is a protocol of the fibre channel architecture and may also be referred to by the formal name of FC-SB5. Further details of FC-SB5 may be found in the publication, "FIBRE CHANNEL Single-Byte Command Code Sets Mapping Protocol-5 (FC-SB-5)", Rev. 2.0, published by the American National Standards Institute on Mar. 26, 2013. A communication protocol may have multiple layers ranging from lower more hardware oriented protocols, to upper more software oriented protocols.

A channel is a direct or a switched point-to-point connection between communicating devices such as between an initiator of a host which initiates an I/O operation, and a target which is the object of the I/O operation. In the Fibre Channel architecture, a FICON channel may perform the functions specified by FC-SB5 to provide access to Input/Output (I/O) devices by means of control units or emulated control units. FICON channels may rely on packet switching for transferring data between communicating devices.

In certain situations, data transfers sent to I/O devices may lead to data overflow at their respective target control units if data is transferred at a rate that exceeds the ability of the target control units to process the data. Certain mechanisms provide a data transfer control feature that allows the target control unit to specify a number and/or size of first-transfer buffers available to the channel. In certain situations, the data transfer control feature defines a first-transfer-buffer size (FTBS) value specified by the target control unit, and a first-transfer-buffer credits (FTBC) value. FTBC may also be referred to as buffer credit. The FTBS and FTBC are stored in the channel and used to limit the amount of data that can be transferred to the target control unit in a first data transfer message. In other situations, the target control unit can specify or dynamically modify the FTBC via a response message sent to the channel in response to receiving a process login or an I/O command or commands and/or executing an I/O operation. Support for the data transfer control feature may be established during a link initialization (e.g., indicated in Process Login request and response messages) between the channel and the control unit.

High performance FICON (zHPF) Extended Distance II is an enhanced buffer management function to improve performance of FICON Transport Mode writes that are greater than a first burst size (e.g. 64 KB) at long distances and to prevent low buffer conditions in the target control unit ports from causing storage area network (SAN) congestion. It is an improvement over zHPF Extended Distance that provided support for disabled first transfer ready. For example, "Extended distance II" is intended to reduce the amount of messages (sometimes referred to as "chitchat") on the data link which would otherwise accompany large data transfers with High performance FICON protocol. With 'Extended Distance II' (ED2), part of the data flow control is intended to be managed by an upper layer protocol via the parameter FTBC (first transfer buffer credit) which is advertised to the initiator of the host by the target control unit at the time of process login by the host initiator. The FTBC parameter is based on the maximum available number of buffers that a target dedicates to the particular connection. From this point onwards until further notice from target to the initiator, the initiator keeps track of the available buffer counts depending on how much was consumed by it to initiate various I/O operations. If under any circumstance, the target wishes to update this parameter, it can do so using a transport response IU (information unit).

The parameter FTBC (first transfer buffer credit) can be very useful in that it can facilitate a determination by the channel whether to carry out the next I/O operation in a first burst ED2 mode in which the first burst of data is a large chunk (e.g. greater than 64 KB) of data or whether to fall back to the traditional (e.g. non-ED2) mode where the first burst is not only a small chunk of the total data, but also where any following chunk of data is restricted from being sent until after a transfer ready IU is received from the target. The ED2 mode is generally the preferred mode because of the reduced chitchat and larger data chunk size which can contribute to higher data throughput and an increased number of I/O operation starts in a given time period, two significant parameters in measuring performance of the channel.

In an attempt to boost performance, targets frequently commit to the initiator, a number or size of buffers which exceeds the actual buffer capacity of the target available to the channel, to induce the initiator to use the ED2 mode for better performance. The amount by which an FTBC (first transfer buffer credit) advertised by a target exceeds the target's actual buffer capacity available to the channel, is referred to as an over-commit and may be expressed in terms of a percentage, for example, of the actual target buffer capacity available to the channel. However, if the buffer space needed by I/O operations exceeds the actual available buffer capacity of the target for that channel, performance can be reduced rather than improved.

SUMMARY

Buffer credit management in accordance with the present description, provides a significant improvement in computer technology. In one embodiment, a data transmission channel is maintained between a channel initiator and a target control unit for I/O operations transmitting data between the channel initiator and buffers of the target control unit for which the target control unit has a predetermined number of buffers available for receiving data transmitted over a data transmission channel to the target control unit. An average lifespan of the buffers of the target control unit is determined in which a buffer lifespan is a function of an amount of time a buffer is committed to an I/O operation. A buffer over-commit value which exceeds the predetermined number of buffers available to the data transmission channel is determined as a function of a determined average lifespan of the buffers of the target control unit. In one embodiment, the buffer over-commit value is determined as inversely proportional to a determined average lifespan of the buffers of the target control unit.

In one embodiment, a difference value between an average duration of an I/O operation over a data transmission channel, and an average of cumulative lifespans that a set of buffers of the target control unit is committed to an I/O operation, is determined. A buffer over-commit value is determined as a function of a determined difference value between the average duration of an I/O operation over a data transmission channel, and the average of cumulative lifespans that a set of buffers of the target control unit is committed to an I/O operation. In one embodiment, the buffer over-commit value is determined as directly proportional to the determined difference value between the average duration of an I/O operation over a data transmission channel, and an average cumulative lifespan of a set of buffers committed to an I/O operation.

In one embodiment, the buffer over-commit value is determined as directly proportional to the determined difference value and is also determined as inversely proportional to a determined average lifespan of the buffers of the target control unit. In one embodiment, a buffer over-commit value represented as variable $N'$ is a function of a relationship $N'=(X-(n \cdot B))/B$ where the average duration of an I/O operation over a data transmission channel is represented by variable $X$, an average number of buffers in a set of buffers of the target control unit committed to an I/O operation is represented by variable $n$, an average lifespan of the buffers of the target control unit is represented by variable $B$, and a cumulative lifespans that a set of buffers of the target control unit is committed to an I/O operation is represented by variable $(n \cdot B)$.

In one embodiment, determining the difference value between an average duration of an I/O operation over a data transmission channel, and an average cumulative lifespan of a set of buffers committed to an I/O operation, determining the average lifespan of the buffers of the target control unit, and determining the buffer over-commit value are performed periodically to provide an updated buffer over-commit value, where the updated buffer over-commit value is communicated to a channel initiator of a data transmission channel.

Implementations of the described techniques may include hardware, a method or process, or computer software on a computer-accessible medium. Other features and aspects may be realized, depending upon the particular application.

BRIEF DESCRIPTION OF THE DRAWINGS

FIG. 4 illustrates an example of operations of a target control unit employing buffer credit management in accordance with one aspect of the present description.

FIG. 5 illustrates another example of operations of a target control unit employing buffer credit management in accordance with one aspect of the present description.

DETAILED DESCRIPTION

Figure 1:
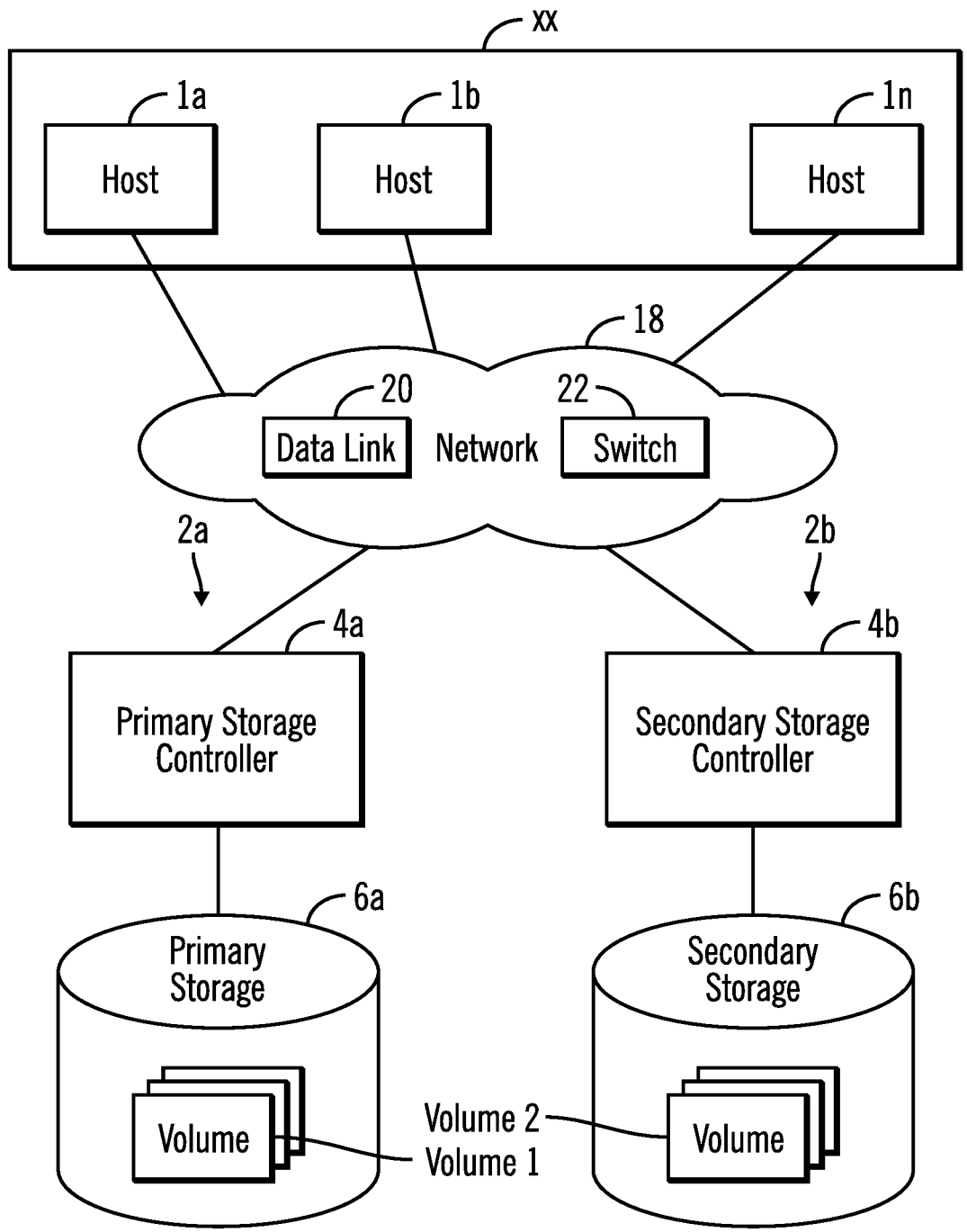
FIG. 1 illustrates an embodiment of a computing environment employing buffer credit management in a data storage system in accordance with one aspect of the present description.

In the following description, reference is made to the accompanying drawings which form a part hereof and which illustrate several embodiments. It is understood that other embodiments may be utilized and structural and operational changes may be made.

Buffer credit management in accordance with the present description provides a significant improvement in computer technology. For example, as previously noted, in an attempt to boost performance, targets frequently commit to the initiator, a number or size of buffers which exceeds the actual buffer capacity of the target available to the channel to induce the initiator to use a higher performance data transfer mode such as the ED2 mode, for better system performance. The amount by which an FTBC (first transfer buffer credit) advertised by a target exceeds the target's actual available buffer capacity, is referred to as an over-commit and may be expressed in terms of a percentage, for example, of the actual available target buffer capacity. However, if the buffer space needed by I/O operations in the ED2 mode exceeds the actual available buffer capacity of the target, performance can be reduced rather than improved. Buffer credit management in accordance with the present description provides a determination of a buffer over-commit value with significantly improved accuracy which increases use of a higher performance data transfer mode, such as the ED2 mode, while reducing instances of an excessively high buffer over-commit value causing a buffer overflow in which the available buffer capacity of a target is exceeded. In this manner, data transfer performance may be significantly improved, providing a significant improvement in computer technology.

In one aspect of the present description, a target control unit includes buffer over-commit logic which optimizes a buffer over-commit value to improve performance of data transfer between the target control unit and channel initiators of hosts. In one embodiment, over-commit logic determines an average lifespan of target control unit buffers provided for the data transmission channels. As used herein, a buffer lifespan is a measure of the duration or amount of time each buffer committed to a particular I/O operations remains committed to that I/O operation. Thus, in one embodiment, the over-commit logic monitors I/O operations between the target control unit and the channel initiators of hosts, monitors the buffer lifespans of the buffers committed to those I/O operations, and stores monitored buffer lifespan data in a suitable data structure.

In one embodiment, the buffer over-commit logic determines a buffer over-commit value as a function of the average lifespan of the buffers of the target control unit. For example, in one embodiment, a buffer over-commit value may be determined as inversely proportional to the average lifespan of the buffers of the target control unit. In one aspect of the present description, it is recognized that the smaller the average lifespan of the buffers of the target control unit, the proportionately larger the buffer over-commit value which may be relied upon by the channel initiators to increase the size or frequency of I/O operations in a high performance data transfer mode without exceeding the actual buffer capacity of the target control unit. Accordingly, at a suitable point-in-time, the buffer over-commit logic communicates an updated current buffer over-commit value to the channel initiators of the data transmission channels being maintained as buffer lifespans change due to various conditions to ensure that the buffer over-commit value relied upon by the channel initiators is an appropriate one for current conditions of the target storage control unit or the network. In this manner, the number of buffer credits relied upon by the channel initiators may be adjusted such that the number of available buffers are not exhausted and a high rate of data transfer is maintained.

In one embodiment, the current buffer over-commit value may be expressed in the format of an FTBC (first transfer buffer credit). Thus, if a target control unit has available ten physical buffers, for example, for a particular channel, and the over-commit value when calculated as a percentage of available buffers such as 120%, for example, the buffer over-commit value may be communicated to the channel initiator as an FTBC value of 12 buffers, not withstanding that the target control unit actually has only ten buffers available for the channel, representing an over-commit of two additional buffers in addition to the ten actual buffers.

However, it is appreciated herein that the more quickly buffers committed to I/O operations are used and released, that is, the shorter the lifespans of the buffers, the less likely that a given buffer over-commit will cause the actual buffer capacity of the target control unit to be exceeded by the I/O operations. Hence, it is appreciated that the magnitude of a buffer over-commit value may be increased in response to a reduction in buffer lifespan. Conversely, the magnitude of a buffer over-commit value may be decreased in response to an increase in buffer lifespan. Thus, in one embodiment, a buffer over-commit value is inversely proportional to buffer lifespan. As a result, channel initiators may, in response to an increased buffer over-commit value, increase the size or frequency of I/O operations in a high performance data transfer mode without exceeding the actual buffer capacity of the target control unit, thereby increasing channel data transmission performance. Conversely, channel initiators may, in response to a decreased buffer over-commit value, decrease the size or frequency of I/O operations to avoid exceeding the actual available buffer capacity of the target control unit, thereby avoiding an adverse effect upon channel data transmission performance. In this manner, the number of buffer credits relied upon by the channel initiators may be adjusted such that the number of available buffers are not exhausted and a high rate of data transfer is maintained.

In another aspect of buffer credit management in accordance with the present description, the over-commit logic determines a difference value between an average duration of an I/O operation over a data transmission channel connected to the target control unit, and an average cumulative lifespan that a set of buffers is committed to an I/O operation. The average lifespan of a single buffer of the set of buffers committed to an I/O operation may be determined as discussed above and may be represented by variable "B".

If variable "n" represents the average number of buffers in a set of buffers used by an I/O operation received by the target control unit, and variable "B" represents the average lifespan of a buffer in a set of buffers used in an I/O operation, an average cumulative buffer lifespan value for a set of buffers of an I/O operation, may be determined as a function of n (the average number of buffers in a set of buffers used by an I/O operation) times B (average lifespan of a buffer in a set of buffers used in an I/O operation), or in other words, as a function of the quantity (n·B) where "·" indicates multiplication.

In one embodiment, the over-commit logic monitors the size of each I/O operation in terms of the quantity of data being transferred by each I/O operation and stores monitored I/O operation size values in a suitable data structure. An average I/O size value may be determined by the over-commit logic based upon monitored I/O size values.

If variable "Y" represents a determined average I/O operation size, and variable "S" represents a fixed or average buffer size for the target control unit, the average number of buffers utilized per I/O operation, represented by variable "n" may be determined as Y/S, that is, the average I/O operation size Y divided by the size S of each buffer. In this manner, an average cumulative lifespan value (n·B) may be determined by the over-commit logic as a function of n (the average number of buffers in a set of buffers used by an I/O operation) times B (average lifespan of a buffer in a set of buffers used in an I/O operation. The determined average cumulative lifespan value (n·B) for a set of buffers of an I/O operation may be stored in a suitable data structure.

In one embodiment, the over-commit logic monitors the duration or amount of time an I/O operation is active, and stores monitored I/O duration values in a suitable data structure. In one embodiment, a duration of time an I/O operation is active may be measured as a function of the time a particular I/O identification number represented by variable "xid", for example, is active or unavailable. An average I/O operation duration value represented by variable "X", may be determined by the over-commit logic based upon monitored I/O duration values.

In one embodiment, the buffer over-commit logic determines a buffer over-commit value as a function of the determined difference value between the average duration of an I/O operation over the data transmission channels connected to the target control unit, and the average of cumulative lifespans that a set of buffers such as the buffers of the target control unit is committed to an I/O operation. For example, if variable "X" represents the average duration of an I/O operation over the data transmission channels, a difference value between X, the average duration of an I/O operation over the data transmission channels, and the quantity (n·B), the average cumulative lifespan that a set of buffers such as the buffers of the target control unit is committed to an I/O operation, may be determined as the difference quantity (X−(n·B)).

In one aspect of the present description, it is recognized that as the difference quantity (X−(n·B)) increases, the over-commit value may be increased accordingly. Conversely, as the difference quantity (X−(n·B)) decreases, the over-commit value may be decreased accordingly Thus, it is appreciated that the over-commit value is directly proportional to the difference quantity (X−(n·B)) and may be periodically communicated to the channel initiators of the hosts to improve system performance. In this manner, the number of buffer credits relied upon by the channel initiators may be adjusted such that the number of available buffers are not exhausted and a high rate of data transfer is maintained.

For example, if a system employing buffer over-commit management in accordance with the present description experiences large loads, the average duration X of the I/O operations may increase as transmission frames of the I/O operations become more interspersed with those of other I/O operations. Thus, even if the buffer processing rate as reflected by the cumulative average lifespan quantity (n·B) remains relatively constant, the difference quantity (X−(n·B)) will increase. Hence the buffer over-commit value may be increased accordingly without exceeding the available buffer capacity of the target control unit. This may be understood as taking advantage of an increasing buffer idle time in each I/O operation as I/O durations increase due to increasing network traffic. Conversely, if the average duration X of the I/O operations decreases, or the buffer processing rate decreases as reflected by the quantity (n·B) increasing, the difference quantity (X−(n·B)) will decrease. Hence the buffer over-commit value may be decreased accordingly to avoid exceeding the available buffer capacity of the target control unit.

As another example, if buffer processing rates increase due to various system operating conditions, the quantity (n·B) will tend to decrease. Thus, even if the average I/O duration X remains relatively constant, the difference quantity (X−(n·B)) will increase. Hence the buffer over-commit value may be increased accordingly without exceeding the buffer capacity of the target control unit. This may be understood as taking advantage of faster buffer processing rates which permit buffers to be released more quickly for use by other I/O operations, reducing cumulative average buffer lifespans as reflected in the quantity (n·B). Conversely, if the average duration X of the I/O operations remains relatively constant, while the buffer processing rate decreases as reflected in an increased cumulative average buffer lifespan quantity (n·B), the difference quantity (X−(n·B)) will decrease. Hence the buffer over-commit value may be decreased accordingly to avoid exceeding the buffer capacity of the target control unit.

As another example, if the average duration X of the I/O operations increases while the buffer processing rate decreases as reflected in an increased cumulative average buffer lifespan quantity (n·B), the difference quantity (X−(n·B)) will may nonetheless increase if the average duration X of I/O operation increases at a faster rate than increases to the cumulative average buffer life span quantity (n·B). Hence the buffer over-commit value may be increased accordingly without exceeding the buffer capacity of the target control unit. This may be understood as taking advantage of an increasing buffer idle time in each I/O operation as I/O durations increase due to network traffic at a higher rate relative to the rate at which cumulative average buffer lifespan is increasing.

Conversely, if the average duration X of the I/O operations increases while the buffer processing rate decreases as reflected in an increased cumulative average buffer lifespan quantity (n·B), the difference quantity (X−(n·B)) will nonetheless decrease if the average duration X of I/O operation increases at a slower rate than increases to the cumulative average buffer life span quantity (n·B). Hence the buffer over-commit value may be decreased accordingly to avoid exceeding the available buffer capacity of the target control unit. This may be understood as taking into account a decreasing buffer idle time in each I/O operation as I/O durations increase due to network traffic at a slower rate relative to the rate at which cumulative average buffer lifespan is increasing.

In another aspect of buffer credit management in accordance with the present description, the buffer over-commit logic determines a buffer over-commit value as a function of the determined difference (X−(n·B)) divided by average buffer lifespan B. Thus, if a buffer over-commit value is represented by the variable N', the buffer over-commit value N' may be determined as, in one embodiment, as:

$$N'=(X-(n \cdot B))/B.$$

In this embodiment, the buffer over-commit value N' represents the average number of buffers N' that each I/O operation of size Y can contribute to the overall buffer over-commit value of the system. Accordingly, a cumulative over-commit value expressed as a percentage, for example, may be generated based upon the relationship for N' set forth above for each I/O operation. For example, if there are an average of n=10 buffers in an I/O operation, and the buffer over-commit value N' for each I/O operation is calculated as one buffer per I/O operation, for example, the cumulative over-commit value may be determined as 110% of the actual number of buffers in the target control unit available for I/O operations. Thus, if the target control unit has 1000 buffers available for I/O operations for a particular data transmission channel and a cumulative over-commit value is calculated as 110% of 1000 buffers for the channel, a cumulative over-commit value of 1100 buffers which is 100 buffers more than the actual available number of buffers in the target control unit, may be determined.

In one aspect of the present description, it is recognized that as the difference quantity (X−(n·B)) of the relationship for N' increases, an over-commit value may be increased accordingly. Thus, it is appreciated that such an over-commit value of this embodiment is directly proportional to the difference quantity (X−(n·B)). It is further appreciated that as the buffer lifespan B of the relationship N' decreases, an over-commit value may be increased accordingly. As a result, it is appreciated that such an over-commit value of this embodiment is also inversely proportional to the buffer lifespan B. The over-commit value N' may be used to periodically update a cumulative over-commit value for a data transmission channel such as a percentage over-commit value for the channel as network traffic or target control unit processing conditions change. The network traffic and control unit processing conditions may be monitored as a function of various operating parameters of the system such as the average I/O operation active time X, the buffer processing rate or average lifespan B, average I/O operation loads or sizes Y, etc.

Implementations of the described techniques may include hardware, a method or process, or computer software on a computer-accessible medium. A system of one or more computers may be configured for buffer credit management in a data storage system in accordance with the present description, by virtue of having software, firmware, hardware, or a combination of them installed on the system that in operation causes or cause the system to perform buffer credit management in accordance with the present description. For example, one or more computer programs may be configured to perform buffer credit management in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
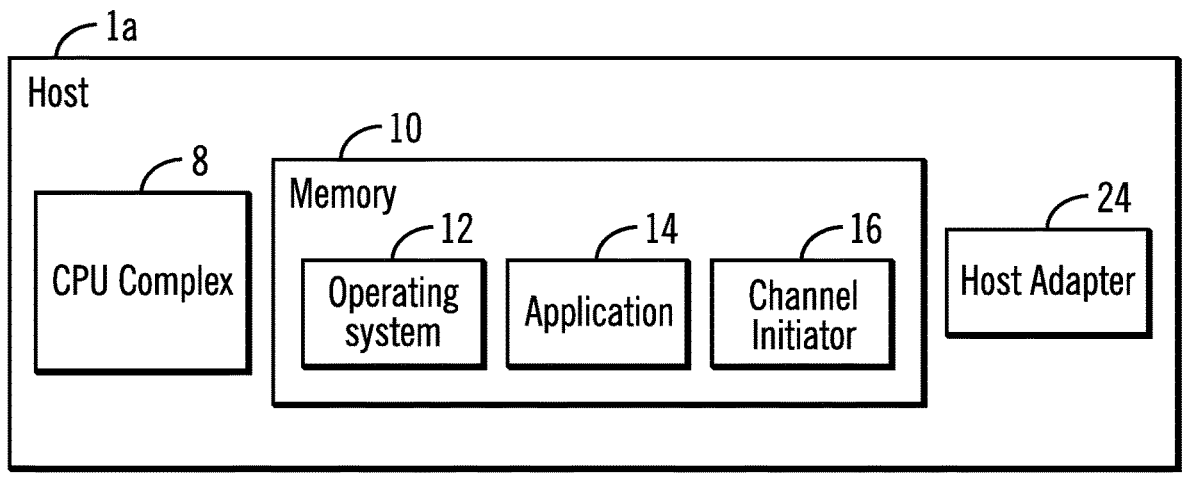
FIG. 2 illustrates an example of a host of the computing environment of FIG. 1.
Figure 3:
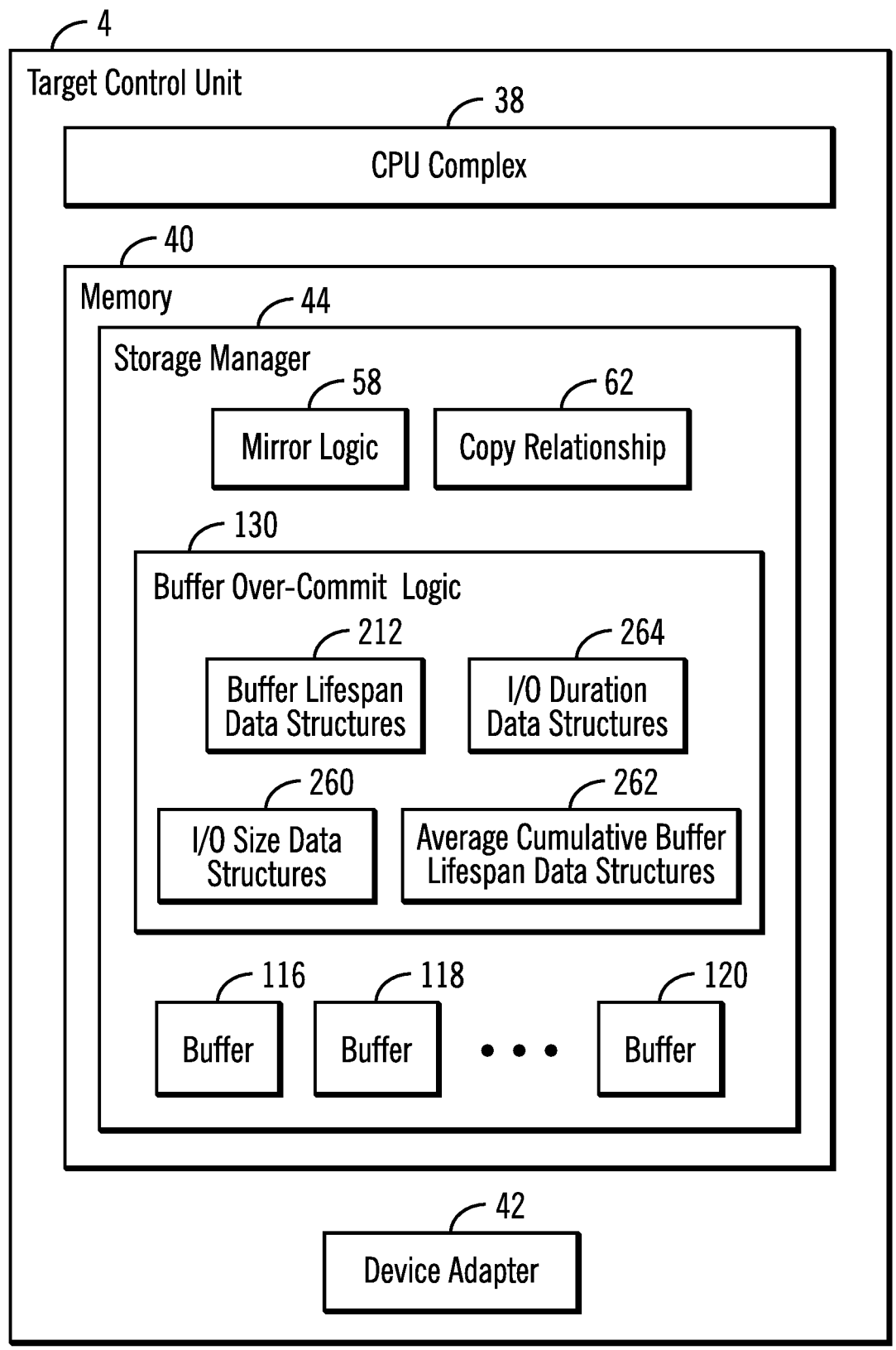
FIG. 3 illustrates an example of a target control unit of the computing environment of FIG. 1.

FIGS. 1-3 illustrate an embodiment of a computing environment employing buffer credit management in a data storage system in accordance with the present description. A plurality of hosts $1a$ (FIGS. 1, 2), $1b$ . . . $1n$ may submit Input/Output (I/O) requests to one or more data storage devices or systems $2a$, $2b$, to read or write data. Each data storage system $2a$, $2b$ includes a storage controller or target control unit $4a$, $4b$, respectively, an example of which is shown in greater detail in FIG. 3 as target control unit 4, which accesses user data and metadata stored in multiple data storage units of storage $6a$, $6b$, respectively.

The hosts $1a$, $1b$ . . . $1n$ may be separate physical devices or may be virtual devices implemented using assigned resources of partitions of a server, for example. In a similar manner, the target control units 4, $4a$, $4b$ of the data storage systems $2a$, $2b$ may be separate physical devices or may be virtual devices implemented using assigned resources of partitions one or more servers, for example.

In the illustrated embodiment, the data storage system $2a$ is a primary data storage system and the data storage system $2b$ is a secondary data storage system in which data stored on the primary data storage system $2a$ by a host is mirrored to the secondary data storage system $2b$. Although the embodiment depicted in FIG. 1 depicts a single secondary data storage system $2b$, it is appreciated that a primary data storage system $2a$ may have more than one secondary data storage system.

A typical host as represented by the host $1a$ of FIG. 2 includes a CPU complex 8 and a memory 10 having an operating system 12, an application 14 and one or more channel initiators 16 that cooperate to read data from and write data updates to the storage $6a$, $6b$ via a target control unit 4 (FIG. 3), $4a$, $4b$. An example of a suitable operating system is the z/OS operating system. It is appreciated that other types of operating systems may be employed, depending upon the particular application.

The I/O requests to the data storage systems $2a$, $2b$ may be transmitted over a network 18 (FIG. 1) which may include one or more data links 20 and switches 22 of a connection fabric to provide a connection path through the connection fabric between a selected host $1a$, $1b$ . . . $1n$ and a selected target such as a data storage system $2a$, $2b$. The channel initiators 16 (FIG. 2) are configured to initiate an I/O operation targeting a data storage system $2a$, $2b$, over a data link 20 (FIG. 1) of the connection fabric of the network 18. Each host $1a$, $1b$ . . . $1n$ has one or more host adapters 24 (FIG. 2) which connects a channel initiator 16 of a host to a data link 20 of the network 18. The channel initiators 16 of the hosts and the data storage system $2a$, $2b$ communicate in accordance with the Fibre Channel Protocol (FCP), FICON or any other suitable protocol.

Thus, the system components $1a$ (FIG. 1), $1b$ . . . $1n$, 4 (FIG. 3), $4a$, $4b$, $6a$, $6b$, are connected to the network 18 which enables communication among these components. As noted above, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts $1a$, $1b$, . . . $1n$ may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

The hosts 1a, 1b ... 1n and the target control units 4, 4a, 4b controlling storage devices 6a, 6b, may each comprise any suitable computational device including those presently known in the art, such as, a personal computer, a workstation, a server, a mainframe, a hand held computer, a palm top computer, a telephony device, a network appliance, a blade computer, a processing device, etc. The hosts 1a, 1b ... 1n and the target control units 4, 4a, 4b may be elements in any suitable network, such as, a storage area network, a wide area network, the Internet, an intranet. In certain embodiments, hosts 1a, 1b ... 1n and the target control units 4, 4a, 4b may be elements in a cloud computing environment.

It is appreciated that one or more data storage units of the storage 6a, 6b may comprise any suitable device capable of storing data in a nonvolatile manner, such as hard drives, solid state drives, tape drives, etc., known in the art. Thus, in one embodiment, the storage 6a, 6b may be comprised of one or more sequential access storage devices, such as hard disk drives and magnetic tape drives or may also include non-sequential access storage devices such as solid state drives (SSD), for example. Such additional devices of storage 10, 6a, 6b may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 6a, 6b may also be other types of storage such as solid state drives in a RAID configuration to facilitate data recovery in the event of loss of a solid state drive. The storage units of the storage 6a, 6b may be configured to store data in subunits of data storage such as volumes, tracks, etc.

Each target control unit 4 (FIG. 3), 4a, 4b of the illustrated embodiment, includes a CPU complex 38 (FIG. 3) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each target control unit 4 (FIG. 3), 4a, 4b further has a memory 40 that includes a storage manager 44 configured to manage storage operations including writing data to or reading data from a storage unit of an associated storage 6a, 6b in response to an I/O data request from a host or mirrored data from another data storage system. Each target control unit 4 (FIG. 3), 4a, 4b has one or more device adapters 42 (FIG. 3) which connects a target control unit to a data link 20 (FIG. 1) of the network 18. The storage manager 44 includes appropriate storage device drivers to configure associated storage 6a, 6b.

The CPU complex 38 of each target control unit 4 (FIG. 3), 4a, 4b may have multiple clusters of processors, each cluster having its own assigned memory 40, storage manager 44, cache, etc. The processing and memory resources assigned each cluster may be physical, virtual, shared, transferrable or dedicated, depending upon the particular application.

In the illustrated embodiment, the storage manager 44 includes mirror logic 58 that is configured to execute in the primary target control unit 4a (FIG. 1) and perform copy operations to copy tracks or other portions of storage volumes from the primary target control unit 4a to the secondary target control unit 4b in a consistent manner. For example, a primary-secondary pair of volumes, volume1, volume2 are in an asynchronous copy or mirror relationship 62 such that updates to the primary volume1 are asynchronously mirrored to each secondary volume2.

In the illustrated embodiment, a copy relationship is represented by a data structure as represented by the copy relationships 62 of the memory 40 of FIG. 3. Thus, one or more copy relationships 62, which may be maintained by the mirror logic 58 for the primary and secondary target control units 4a, 4b, (FIG. 1) associate primary storage locations in the primary storage 6a and corresponding secondary storage locations in each of the secondary storage drives as represented by the storage 6b of the mirror relationship, such that updates to locations of the primary storage 6a are mirrored, that is, copied to the corresponding locations of the secondary storage 10b. For example, source storage locations in a primary storage volume1 (FIG. 1) of storage 6a may be asynchronously mirrored in a mirror operation to target storage locations of a secondary volume2 of the storage 6b pursuant to a mirror copy relationship 62 (FIG. 3). Similarly, source storage locations in the primary storage volume1 (FIG. 1) of storage 6a may be asynchronously mirrored in a mirror operation to additional target storage locations of another secondary volume2 of another secondary data storage system pursuant to a mirror copy relationship 62 (FIG. 3).

In the illustrated embodiment, a copy relationship of the copy relationships 62 comprises an asynchronous mirror relationship for a pair of storage locations in which updates to the primary (source) storage locations of the mirror relationship 62 are asynchronously mirrored to the secondary (target) storage locations of the mirror relationship 62. It is appreciated that other types of copy relationships such as synchronous, for example, may be established, depending upon the particular application.

The target control unit 4 controls a plurality of buffers 116, 118, . . . , 120 that are shared for storing the data received from the channel initiators 16 of the hosts 1a, 1b . . . 1n by the control unit 4. In certain embodiments, the buffers 116, 118, . . . , 120 are referred to as receive buffers. In certain embodiments, each buffer may be 64 kilobytes in size and there may be 2000 buffers, for example. It is appreciated that the size and number of buffers may vary, depending upon the particular application.

In one aspect of the present description, the target control unit 4 includes a buffer over-commit logic 130 for optimizing a buffer over-commit value to improve performance of data transfer between the target control unit 4 and the channel initiators 16 of the hosts 1a, 1b . . . 1n. The buffer over-commit logic 130 may be implemented in software, hardware, firmware or any combination thereof.

FIG. 4 depicts one example of operations of the storage manager 44 (FIG. 3) performing one embodiment of buffer credit management in accordance with the present description. In this embodiment, the storage manager 44 is configured to maintain (block 204, FIG. 4) data transmission channels between channel initiators of hosts such as the hosts 1a, 1b . . . 1n (FIG. 1), for example, and the control unit 4 (FIG. 3) of the storage manager 44.

The over-commit logic 130 is configured to determine (block 208, FIG. 4) an average lifespan of the buffers 116, 118 . . . 120 provided by the storage manager 44 of the target control unit 4 for the data transmission channels. As used herein, a buffer lifespan is a measure of the duration or amount of time each buffer committed to a particular I/O operations remains committed to that I/O operation. Thus, in one embodiment, the over-commit logic 130 monitors I/O operations between the target control unit 4 and the channel initiators 16 of the hosts 1a, 1b . . . 1n, and monitors the buffer lifespans of buffers 116, 118 . . . 120 committed to those I/O operations. For example, the over-commit logic 130 in one embodiment, is configured to monitor the amount of time each buffer committed to a particular I/O operations remains committed to that I/O operation, and store monitored buffer lifespans in a suitable data structure represented by the buffer lifespan data structures 212 of the target control unit 4.

An average buffer life span may be determined by the over-commit logic 130 based upon monitored buffer lifespans. Such an average may for example, be computed based upon all buffer lifespans monitored in particular intervals of time such as the most recent time interval, or multiple intervals of time which may have operational characteristics such as time of day, or network conditions, for example, in common. It is appreciated that such an average buffer lifespan may be determined using other techniques, depending upon the particular application.

In one embodiment, the buffer over-commit logic 130 is configured to determine (block 216, FIG. 4) a buffer over-commit value as a function of the average lifespan of the buffers of the target control unit. For example, in one embodiment, a buffer over-commit value may be determined as inversely proportional to the average lifespan of the buffers of the target control unit. As used herein, the term average buffer lifespan is the average amount of time a buffer is committed to an I/O operation.

In one aspect of the present description, it is recognized that the smaller the average lifespan of the buffers of the target control unit, the larger the buffer over-commit value which may be relied upon by the channel initiators to increase the size or frequency of I/O operations without exceeding the actual available buffer capacity of the target control unit. Accordingly, at a suitable point-in-time, the buffer over-commit logic 130 communicates (block 220) the current buffer over-commit value to the channel initiator of the data transmission channels being maintained.

In one embodiment, the current buffer over-commit value may be expressed in the format of an FTBC (first transfer buffer credit). Thus, if a target control unit has available ten physical buffers, for example, for a particular channel, and the over-commit value when calculated as a percentage of available buffers is calculated as 120%, for example, the buffer over-commit value may be communicated to the channel initiator as an FTBC value of 12 buffers, notwithstanding that the target control unit only has ten buffers available for the channel, representing an over-commitment of two additional buffers in addition to the ten actual buffers. However, it is appreciated herein that the more quickly buffers committed to I/O operations are used and released, that is, the shorter the lifespans of the buffers, the less likely that a given buffer over commit will cause the actual buffer capacity of the target control unit to be exceeded by the I/O operations. Hence, it is appreciated that the magnitude of a buffer over-commit value may be increased proportionately in response to a reduction in buffer lifespan, and thus is inversely proportional to buffer lifespan. In this manner, channel initiators may, in response to an increased buffer over-commit value, increase the size or frequency of I/O operations without exceeding the actual buffer capacity of the target control unit, thereby increasing channel data transmission performance.

FIG. 5 depicts another example of operations of the storage manager 44 (FIG. 3) performing buffer credit management in accordance with the present description. In a manner similar to that described above in connection with FIG. 4, the storage manager 44 is configured to maintain (block 254, FIG. 5) data transmission channels between channel initiators of hosts such as the hosts 1a, 1b . . . 1n (FIG. 1), for example, and the control unit 4 (FIG. 3) of the storage manager 44.

In another aspect of buffer credit management in accordance with the present description, the over-commit logic 130 is configured to determine (block 258, FIG. 5) a difference value between an average duration of an I/O operation over a data transmission channel connected to the target control unit, and an average cumulative lifespan that a set of buffers such as the buffers 116, 118 . . . 120, is committed to an I/O operation.

The average lifespan of a single buffer of the set of buffers committed to an I/O operation may be determined as discussed above in connection with FIG. 4, and may be represented by variable "B". Thus, here too, in one embodiment, the over-commit logic 130 monitors I/O operations between the target control unit 4 and the channel initiators 16 of the hosts 1a, 1b . . . 1n, and monitors the individual buffer lifespans of buffers 116, 118 . . . 120 committed to those I/O operations. For example, the over-commit logic 130 in one embodiment, is configured to monitor the amount of time each buffer committed to a particular I/O operations remains committed to that I/O operation, and store monitored buffer lifespan values in a suitable data structure represented by the buffer lifespan data structures 212 of the target control unit 4. An average buffer life span B may be determined by the over-commit logic 130 based upon monitored buffer lifespan values as described above.

If variable "n" represents the average number of buffers in a set of buffers used by an I/O operation received by the target control unit, and variable "B" represents the average lifespan of a buffer in a set of buffers used in an I/O operation, an average cumulative buffer lifespan value for a set of buffers of an I/O operation, may be determined as a function of n (the average number of buffers in a set of buffers used by an I/O operation) times B (average lifespan of a buffer in a set of buffers used in an I/O operation), or in other words, as a function of the quantity (n·B) where "·" indicates multiplication.

In one embodiment, the over-commit logic 130 monitors I/O operations between the target control unit 4 and the channel initiators 16 of the hosts 1a, 1b . . . 1n, and monitors the size of each I/O operation in terms of the quantity of data being transferred by each I/O operation and stores monitored I/O operation size values in a suitable data structure represented by I/O size data structures 260. An average I/O size value may be determined by the over-commit logic 130 based upon monitored I/O size values.

Such an average I/O size value may for example, be computed based upon the sizes of all I/O operations monitored in particular intervals of time such as the most recent time interval, or multiple intervals of time which may have operational characteristics such as time of day or network conditions, for example, in common. It is appreciated that such an average I/O size value may be determined using other techniques, depending upon the particular application.

If variable "Y" represents a determined average I/O operation size, and variable "S" represents a fixed buffer size for the target control unit 4 (FIG. 3), the average number of buffers utilized per I/O operation, represented by variable "n" may be determined as Y/S, that is, the average I/O operation size Y divided by the size S of each buffer. In this manner, an average cumulative lifespan value (n·B) may be determined by the over-commit logic 130 as a function of n (the average number of buffers in a set of buffers used by an I/O operation) times B (average lifespan of a buffer in a set of buffers used in an I/O operation. The determined average cumulative lifespan value (n·B) for a set of buffers of an I/O operation may be stored in a suitable data structure such as the data structure 262 of FIG. 3.

It is appreciated that the buffer size for I/O operations may not be fixed in some embodiments. Accordingly, variable "S" (of the quantity Y/S) may represent an average buffer size rather than a fixed buffer size, for example. An average buffer size may be determined by, for example, monitoring I/O operations and the size of each buffer used in the I/O operation and determining an average buffer size value for the monitored I/O operations. It is appreciated that other techniques may be used to determine an average number of buffers, depending upon the particular application.

In one embodiment, the over-commit logic 130 in monitoring I/O operations between the target control unit 4 and the channel initiators 16 of the hosts 1a, 1b . . . 1n, also monitors the duration or amount of time an I/O operation is active, stores monitored I/O duration values in a suitable data structure represented by I/O duration data structures 264. In one embodiment, a duration of time an I/O operation is active may be measured as a function of the time a particular I/O identification number represented by variable "xid", for example, is active or unavailable. An average I/O operation duration value represented by variable "X", may be determined by the over-commit logic 130 based upon monitored I/O duration values.

Such an average I/O duration value X may be computed, for example, based upon the durations of all I/O operations monitored in particular intervals of time such as the most recent time interval, or multiple intervals of time which may have operational characteristics such as time of day or network conditions, for example, in common. It is appreciated that such an average I/O duration value may be determined using other techniques, depending upon the particular application.

In one embodiment, the buffer over-commit logic 130 is configured to determine (block 270, FIG. 5) a buffer over-commit value as a function of the determined difference value between the average duration of an I/O operation over the data transmission channels connected to the target control unit, and the average of cumulative lifespans that a set of buffers such as the buffers of the target control unit is committed to an I/O operation. For example, if variable "X" represents the average duration of an I/O operation over the data transmission channels, a difference value between X, the average duration of an I/O operation over the data transmission channels, and the quantity (n·B), the average cumulative lifespan that a set of buffers such as the buffers of the target control unit is committed to an I/O operation, may be determined as the difference quantity (X−(n·B)).

In one aspect of the present description, it is recognized that as the difference quantity (X−(n·B)) increases, the over-commit value may be increased accordingly. Thus, it is appreciated that the over-commit value is directly proportional to the difference quantity (X−(n·B)) and may be communicated (block 274, FIG. 5) to the channel initiators of the hosts to improve system performance.

For example, if a system employing buffer over-commit management in accordance with the present description experiences large loads, the average duration X of the I/O operations may increase as transmission frames of the I/O operations become more interspersed with those of other I/O operations. Thus, even if the buffer processing rate as reflected by the cumulative average lifespan quantity (n·B) remains relatively constant, the difference quantity (X−(n·B)) may increase. Hence the buffer over-commit value may be increased accordingly without exceeding the buffer capacity of the target control unit. This may be understood as taking advantage of an increasing buffer idle time in each I/O operation as I/O durations increase due to increasing network traffic. Conversely, if the average duration X of the I/O operations decreases, while the buffer processing rate as reflected by the quantity (n·B) remains relatively constant, the difference quantity (X−(n B)) will decrease. Hence the buffer over-commit value may be decreased accordingly to avoid exceeding the buffer capacity of the target control unit.

As another example, if buffer processing rates increase due to various system operating conditions, the quantity (n·B) will tend to decrease. Thus, even if the average I/O duration X remains relatively constant, the difference quantity (X−(n·B)) will increase. Hence the buffer over-commit value may be increased accordingly without exceeding the buffer capacity of the target control unit. This may be understood as taking advantage of faster buffer processing rates which permit buffers to be released more quickly for use by other I/O operations, reducing cumulative average buffer lifespans as reflected in the quantity (n·B). Conversely, if the average duration X of the I/O operations remains relatively constant, while the buffer processing rate decreases as reflected in an increased cumulative average buffer lifespan quantity (n·B), the difference quantity (X−(n·B)) will decrease. Hence the buffer over-commit value may be decreased accordingly to avoid exceeding the buffer capacity of the target control unit.

As another example, if the average duration X of the I/O operations increases while the buffer processing rate decreases as reflected in an increased cumulative average buffer lifespan quantity (n·B), the difference quantity (X−(n·B)) may nonetheless increase if the average duration X of I/O operation increases at a faster rate than increases to the cumulative average buffer life span quantity (n·B). Hence the buffer over-commit value may be increased accordingly without exceeding the available buffer capacity of the target control unit. This may be understood as taking advantage of an increasing buffer idle time in each I/O operation as I/O durations increase due to network traffic increasing at a higher rate relative to the rate at which cumulative average buffer lifespan is increasing.

Conversely, if the average duration X of the I/O operations increases while the buffer processing rate decreases as reflected in an increased cumulative average buffer lifespan quantity (n·B), the difference quantity (X−(n·B)) will may nonetheless decrease if the average duration X of I/O operation increases at a slower rate than increases to the cumulative average buffer lifespan quantity (n·B). Hence the buffer over-commit value may be decreased accordingly to avoid exceeding the buffer capacity of the target control unit. This may be understood as taking into account a decreasing buffer idle time in each I/O operation as I/O durations increase due to network traffic increasing at a slower rate relative to the rate at which cumulative average buffer lifespan is increasing.

Figure 6:
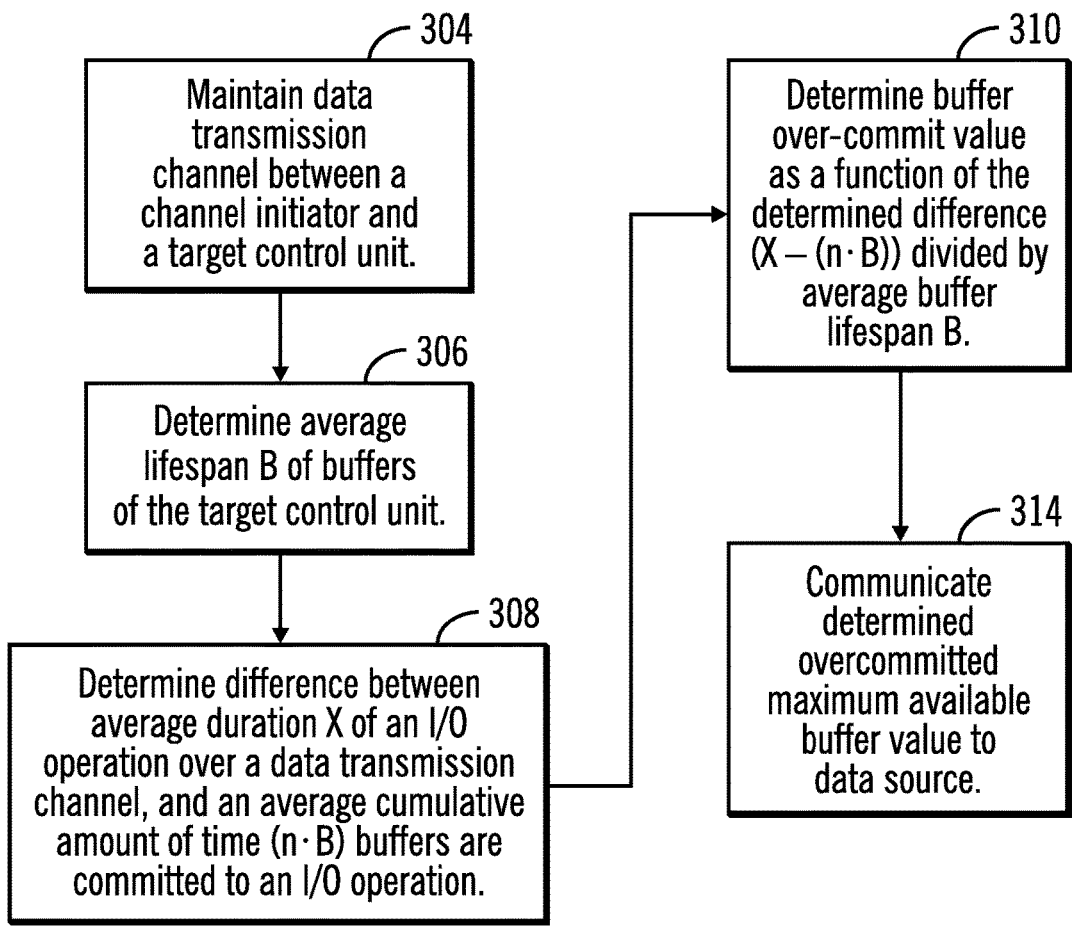
FIG. 6 illustrates another example of operations of a target control unit employing buffer credit management in accordance with one aspect of the present description.

FIG. 6 depicts another example of operations of the storage manager 44 (FIG. 3) performing buffer credit management in accordance with the present description. In a manner similar to that described above in connection with FIGS. 4, 5, the storage manager 44 is configured to maintain (block 304, FIG. 6) data transmission channels between channel initiators of hosts such as the hosts 1a, 1b . . . 1n (FIG. 1), for example, and the control unit 4 (FIG. 3) of the storage manager 44.

In another aspect of buffer credit management in accordance with the present description, in a manner similar to that described above in connection with FIG. 4, the over-commit logic 130 is configured to determine (block 306, FIG. 6) an average lifespan B of the buffers 116, 118 . . . 120 provided by the storage manager 44 of the target control unit 4 for the data transmission channels. In addition, in a manner similar to that described above in connection with FIG. 5, the over-commit logic 130 is configured to determine (block 308, FIG. 6) a difference value between an average duration X of an I/O operation over a data transmission channel connected to the target control unit, and an average cumulative lifespan (n·B) that a set of buffers such as the buffers 116, 118 . . . 120, is committed to an I/O operation.

In this embodiment, the buffer over-commit logic 130 is configured to determine (block 310, FIG. 6) a buffer over-commit value as a function of the determined difference (X−(n·B)) divided by average buffer lifespan B. Thus, if a buffer over-commit value is represented by the variable N', the buffer over-commit value N' may be determined, in one embodiment, as:

$$N' = (X - (n \cdot B))/B.$$

In this embodiment, the buffer over-commit value N' represents the average number of buffers N' that each I/O operation of size Y can contribute to the overall buffer over-commit value of the system. Accordingly, a cumulative over-commit value expressed as a percentage, for example, may be generated based upon the relationship for N' set forth above for each I/O operation. For example, if there are an average of n=10 buffers in an I/O operation, and the buffer over-commit value N' for each I/O operation is calculated as one buffer per I/O operation, for example, the cumulative over-commit value may be determined as 110% of the actual number of buffers in the target control unit available for I/O operations. Thus, if the target control unit has 1000 buffers available for I/O operations for a particular data transmission channel and a cumulative over-commit value is calculated as 110% of 1000 buffers for the channel, a cumulative over-commit value of 1100 buffers which is 100 buffers more than the actual number of buffers in the target control unit, may be determined.

In one aspect of the present description, it is recognized that as the difference quantity (X−(n·B)) of the relationship for N' increases, an over-commit value may be increased accordingly. Thus, it is appreciated that such an over-commit value of this embodiment is directly proportional to the difference quantity (X−(n·B)). It is further appreciated that as the buffer lifespan B of the relationship N' decreases, an over-commit value may be increased accordingly. As a result, it is appreciated that such an over-commit value of this embodiment is also inversely proportional to the buffer lifespan B. The over-commit value N' may be used to periodically update a cumulative over-commit value for a data transmission channel such as a percentage over-commit value for the channel as network traffic and target control unit processing conditions change. The network traffic and target control unit processing conditions may be monitored as a function of various operating parameters of the system such as the average I/O operation active time X, the buffer processing rate or average lifespan B, average I/O operation loads or sizes Y, etc.

An over-commit value such as a cumulative overcommit value may be communicated (block 314, FIG. 6) to the channel initiators of the hosts to improve system performance. As noted above, a current buffer over-commit value may be expressed in the format of an FTBC (first transfer buffer credit). Thus, if a target control unit has available 1000 physical buffers, for example, for a particular channel, and the over-commit value when calculated as a percentage of available buffers is calculated as 120%, for example, the buffer over-commit value may be communicated to the channel initiator as an FTBC value of 1200 buffers, not withstanding that the target control unit only has 1000 buffers available for the channel, representing an over-commitment of two hundred additional buffers in addition to the 1000 actual buffers.

It is seen from the above, that buffer credit management in accordance with the present description can increase I/O operation size and frequency to improve data transmission performance without causing an increase in exceeding buffer capacity. In this manner, a significant improvement in computer technology is provided.

Figure 7:
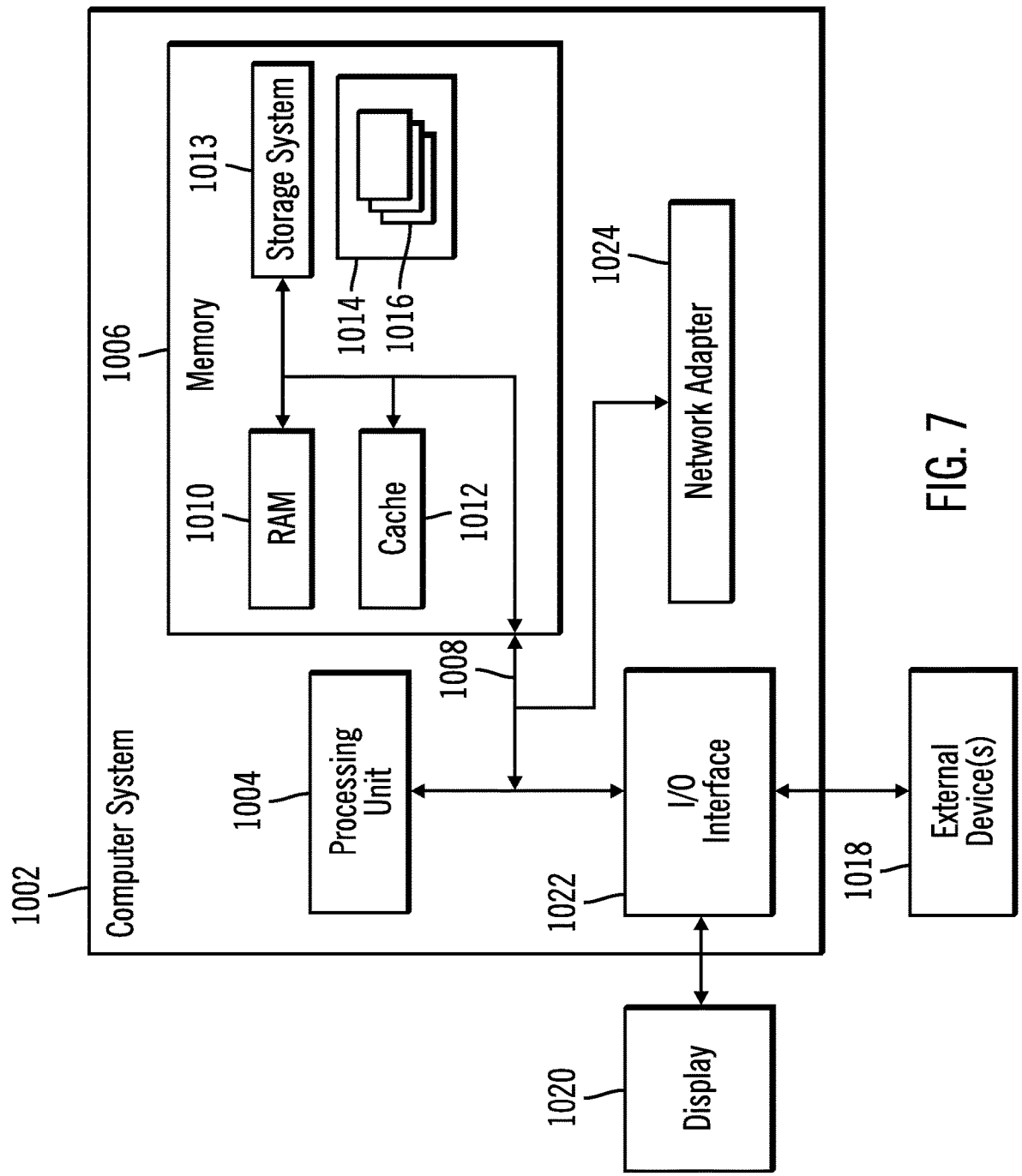
FIG. 7 illustrates another computer embodiment employing buffer credit management in a data storage system in accordance with the present description.

The computational components of the figures may each be implemented in one or more computer systems, such as the computer system 1002 shown in FIG. 7. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with a data storage system having a channel initiator of a host and a target control unit having buffers and at least one storage unit controlled by the target control unit, wherein the target control unit has a processor, and wherein the computer program product comprises a computer readable storage medium having program instructions embodied therewith, the program instructions executable by a processor of the target control unit to cause target control unit processor operations, the target control unit processor operations comprising:

maintaining a data transmission channel between a channel initiator and a target control unit for I/O operations transmitting data between the channel initiator and buffers of the target control unit wherein the target control unit has a predetermined number of buffers available for receiving data transmitted over a data transmission channel to the target control unit;

determining an average lifespan of the buffers of the target control unit wherein a buffer lifespan is a function of an amount of time a buffer is committed to an I/O operation; and determining a buffer over-commit value which exceeds the predetermined number of buffers available to the data transmission channel wherein the buffer over-commit value is determined as a function of a determined average lifespan of the buffers of the target control unit.

2. The computer program product of claim 1 wherein the buffer over-commit value is determined as inversely proportional to a determined average lifespan of the buffers of the target control unit.

3. The computer program product of claim 1 further comprising:
determining a difference value between an average duration of an I/O operation over a data transmission channel, and an average of cumulative lifespans that a set of buffers of the target control unit is committed to an I/O operation; and
wherein the buffer over-commit value is determined as a function of a determined difference value between the average duration of an I/O operation over a data transmission channel, and the average of cumulative lifespans that a set of buffers of the target control unit is committed to an I/O operation.

4. The computer program product of claim 3 wherein the buffer over-commit value is determined as directly proportional to the determined difference value between the average duration of an I/O operation over a data transmission channel, and an average cumulative lifespan of a set of buffers committed to an I/O operation.

5. The computer program product of claim 4 wherein the buffer over-commit value is also determined as inversely proportional to a determined average lifespan of the buffers of the target control unit.

6. The computer program product of claim 5 wherein the buffer over-commit value represented as variable N' is greater than zero and a function of a relationship $N'=(X-(n \cdot B))/B$ wherein the average duration of an I/O operation over a data transmission channel is represented by variable X greater than zero, an average number of buffers in a set of buffers of the target control unit committed to an I/O operation is represented by variable n greater than zero, an average lifespan of the buffers of the target control unit is represented by variable B greater than zero, and a cumulative lifespans that a set of buffers of the target control unit is committed to an I/O operation is represented by variable $(n \cdot B)$ greater than zero.

7. The computer program product of claim 3 wherein determining the difference value between an average duration of an I/O operation over a data transmission channel, and an average cumulative lifespan of a set of buffers committed to an I/O operation, determining the average lifespan of the buffers of the target control unit, and determining the buffer over-commit value are performed periodically to provide an updated buffer over-commit value, and wherein the updated buffer over-commit value is communicated to a channel initiator of a data transmission channel.

8. A method, comprising:
maintaining a data transmission channel between a channel initiator and a target control unit for I/O operations transmitting data between the channel initiator and buffers of the target control unit wherein the target control unit has a predetermined number of buffers available for receiving data transmitted over a data transmission channel to the target control unit;
determining an average lifespan of the buffers of the target control unit wherein a buffer lifespan is a function of an amount of time a buffer is committed to an I/O operation; and
determining a buffer over-commit value which exceeds the predetermined number of buffers available to the data transmission channel wherein the buffer over-commit value is determined as a function of a determined average lifespan of the buffers of the target control unit.

9. The method of claim 8 wherein the buffer over-commit value is determined as inversely proportional to a determined average lifespan of the buffers of the target control unit.

10. The method of claim 8 further comprising:
determining a difference value between an average duration of an I/O operation over a data transmission channel, and an average of cumulative lifespans that a set of buffers of the target control unit is committed to an I/O operation; and
wherein the buffer over-commit value is determined as a function of a determined difference value between the average duration of an I/O operation over a data transmission channel, and the average of cumulative lifespans that a set of buffers of the target control unit is committed to an I/O operation.

11. The method of claim 10 wherein the buffer over-commit value is determined as directly proportional to the determined difference value between the average duration of an I/O operation over a data transmission channel, and an average cumulative lifespan of a set of buffers committed to an I/O operation.

12. The method of claim 11 wherein the buffer over-commit value is also determined as inversely proportional to a determined average lifespan of the buffers of the target control unit.

13. The method of claim 12 wherein the buffer over-commit value represented as variable N' is greater than zero and a function of a relationship $N'=(X-(n \cdot B))/B$ wherein the average duration of an I/O operation over a data transmission channel is represented by variable X greater than zero, an average number of buffers in a set of buffers of the target control unit committed to an I/O operation is represented by variable n greater than zero, an average lifespan of the buffers of the target control unit is represented by variable B greater than zero, and a cumulative lifespans that a set of buffers of the target control unit is committed to an I/O operation is represented by variable $(n \cdot B)$ greater than zero.

14. The method of claim 10 wherein determining the difference value between an average duration of an I/O operation over a data transmission channel, and an average cumulative lifespan of a set of buffers committed to an I/O operation, determining the average lifespan of the buffers of the target control unit, and determining the buffer over-commit value are performed periodically to provide an updated buffer over-commit value, and wherein the updated buffer over-commit value is communicated to a channel initiator of a data transmission channel.

15. A system, for use with a host having a channel initiator, comprising:
a target control unit having buffers and at least one storage unit controlled by the target control unit, wherein the target control unit has a processor; and
a computer program product comprising a computer readable storage medium having program instructions embodied therewith, the program instructions executable by a processor of the target control unit to cause target control unit processor operations, the target control unit processor operations comprising:
maintaining a data transmission channel between a channel initiator and a target control unit for I/O operations transmitting data between the channel initiator and buffers of the target control unit wherein the target control unit has a predetermined number of buffers available for receiving data transmitted over a data transmission channel to the target control unit;

determining an average lifespan of the buffers of the target control unit wherein a buffer lifespan is a function of an amount of time a buffer is committed to an I/O operation; and determining a buffer over-commit value which exceeds the predetermined number of buffers available to the data transmission channel wherein the buffer over-commit value is determined as a function of a determined average lifespan of the buffers of the target control unit.

16. The system of claim 15 wherein the buffer over-commit value is determined as inversely proportional to a determined average lifespan of the buffers of the target control unit.

17. The system of claim 15 wherein the target control unit processor operations further comprise:

determining a difference value between an average duration of an I/O operation over a data transmission channel, and an average of cumulative lifespans that a set of buffers of the target control unit is committed to an I/O operation; and wherein the buffer over-commit value is determined as a function of a determined difference value between the average duration of an I/O operation over a data transmission channel, and the average of cumulative lifespans that a set of buffers of the target control unit is committed to an I/O operation.

18. The system of claim 17 wherein the buffer over-commit value is determined as directly proportional to the determined difference value between the average duration of an I/O operation over a data transmission channel, and an average cumulative lifespan of a set of buffers committed to an I/O operation.

19. The system of claim 18 wherein the buffer over-commit value is also determined as inversely proportional to a determined average lifespan of the buffers of the target control unit.

20. The system of claim 19 wherein the buffer over-commit value represented as variable $N'$ is greater than zero and a function of a relationship $N'=(X-(n \cdot B))/B$ wherein the average duration of an I/O operation over a data transmission channel is represented by variable $X$ greater than zero, an average number of buffers in a set of buffers of the target control unit committed to an I/O operation is represented by variable $n$ greater than zero, an average lifespan of the buffers of the target control unit is represented by variable $B$ greater than zero, and a cumulative lifespans that a set of buffers of the target control unit is committed to an I/O operation is represented by variable $(n \cdot B)$ greater than zero.

21. The system of claim 17 wherein determining the difference value between an average duration of an I/O operation over a data transmission channel, and an average cumulative lifespan of a set of buffers committed to an I/O operation, determining the average lifespan of the buffers of the target control unit, and determining the buffer over-commit value are performed periodically to provide an updated buffer over-commit value, and wherein the updated buffer over-commit value is communicated to a channel initiator of a data transmission channel.

* * * * *